United States Patent
Matsumoto

(10) Patent No.: US 8,880,251 B2
(45) Date of Patent: Nov. 4, 2014

(54) HYBRID VEHICLE AND METHOD OF CONTROLLING HYBRID VEHICLE

(75) Inventor: Junichi Matsumoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 337 days.

(21) Appl. No.: 13/127,575

(22) PCT Filed: Nov. 5, 2008

(86) PCT No.: PCT/JP2008/070092
§ 371 (c)(1),
(2), (4) Date: May 4, 2011

(87) PCT Pub. No.: WO2010/052766
PCT Pub. Date: May 14, 2010

(65) Prior Publication Data
US 2011/0213524 A1    Sep. 1, 2011

(51) Int. Cl.
*B60K 6/28* (2007.10)
*H01M 10/44* (2006.01)
*B60L 11/18* (2006.01)
*H01M 10/48* (2006.01)
*H02J 7/14* (2006.01)
*B60W 10/26* (2006.01)
*B60K 6/445* (2007.10)
*B60W 20/00* (2006.01)

(52) U.S. Cl.
CPC ........... *B60L 11/187* (2013.01); *H01M 10/443* (2013.01); *Y02T 10/6239* (2013.01); *B60L 11/1861* (2013.01); *Y02T 10/7044* (2013.01); *Y02T 10/705* (2013.01); *H01M 10/486* (2013.01); *H01M 10/48* (2013.01); *H02J 7/1453* (2013.01); *B60W 10/26* (2013.01); *Y02T 10/7005* (2013.01); *B60W 2510/246* (2013.01); *Y02E 60/12* (2013.01); *B60W 2510/244* (2013.01); *B60K 6/445* (2013.01); *B60L 11/1872* (2013.01); *B60W 20/00* (2013.01); *Y10S 903/903* (2013.01)
USPC .......................... 701/22; 180/65.29; 903/903

(58) Field of Classification Search
USPC ........... 701/22; 320/104; 180/65.29; 903/903
See application file for complete search history.

(56) References Cited

U.S. PATENT DOCUMENTS 6,936,995 B2 * 8/2005 Kapsokavathis et al. ...... 320/132
7,053,588 B2 * 5/2006 Nakanishi et al. ............ 320/104

(Continued)

FOREIGN PATENT DOCUMENTS

JP    2005-124353 A    5/2005
JP    2006-101674 A    4/2006

(Continued)

OTHER PUBLICATIONS

International Search Report mailed Feb. 24, 2009 of PCT/JP2008/070092.

*Primary Examiner* — Calvin Cheung
*Assistant Examiner* — Allen E Quillen
(74) *Attorney, Agent, or Firm* — Kenyon & Kenyon LLP

(57) ABSTRACT

A battery ECU detects a state of charge and a temperature of a power storage unit, and transmits the state of charge and the temperature to an HV-ECU. The HV-ECU calculates the charge/discharge allowable power of the power storage unit based on the state of charge and the temperature of the power storage unit, and sets control-specific charge/discharge allowable power by correcting the charge/discharge allowable power so as to limit the charge/discharge allowable power to be changed at a predetermined first change speed. The HV-ECU then determines the power target value in accordance with the request from the driver within the range of the control-specific charge/discharge allowable power. The HV-ECU sets the control-specific charge/discharge allowable power such that, at start-up of the vehicle, the maximum value in the charge/discharge allowable power characteristics of the power storage unit is set as an initial value and the value is decreased from the initial value at the predetermined second change speed higher than the first change speed.

4 Claims, 5 Drawing Sheets

(56) References Cited

U.S. PATENT DOCUMENTS

| | | | |
|---|---|---|---|
| 7,099,757 B2* | 8/2006 | Niki et al. | 701/22 |
| 7,127,337 B2* | 10/2006 | Bennett et al. | 701/22 |
| 7,296,648 B2* | 11/2007 | Tatara et al. | 180/242 |
| 7,449,891 B2* | 11/2008 | Cawthorne | 324/427 |
| 7,469,760 B2* | 12/2008 | Kamen et al. | 180/65.31 |
| 7,478,692 B2* | 1/2009 | Taue et al. | 180/65.29 |
| 7,487,851 B2* | 2/2009 | Buck et al. | 180/65.265 |
| 7,653,474 B2* | 1/2010 | Cawthorne et al. | 701/99 |
| 7,714,543 B2* | 5/2010 | Yoshida | 320/134 |
| 7,741,805 B2* | 6/2010 | Zhang et al. | 320/104 |
| 7,772,799 B2* | 8/2010 | Wu | 320/104 |
| 7,957,921 B2* | 6/2011 | Tang et al. | 702/63 |
| 8,035,252 B2* | 10/2011 | Ichikawa et al. | 307/82 |
| 8,053,921 B2* | 11/2011 | Ichikawa | 307/9.1 |
| 8,154,254 B2* | 4/2012 | Ichikawa et al. | 320/134 |
| 8,212,532 B2* | 7/2012 | Kumar | 320/155 |
| 8,356,472 B2* | 1/2013 | Hiranuma et al. | 60/286 |
| 2009/0145673 A1* | 6/2009 | Soliman et al. | 180/65.1 |
| 2010/0164438 A1* | 7/2010 | Saito | 320/152 |
| 2012/0188068 A1* | 7/2012 | Hanna et al. | 340/441 |
| 2012/0200257 A1* | 8/2012 | Schwarz et al. | 320/109 |
| 2012/0261397 A1* | 10/2012 | Schwarz et al. | 219/202 |

FOREIGN PATENT DOCUMENTS

| | | |
|---|---|---|
| JP | 2006-257895 A | 9/2006 |
| JP | 2006-262634 A | 9/2006 |
| JP | WO2007/119820 * | 10/2007 |
| WO | 2008/111593 A1 | 9/2008 |

* cited by examiner

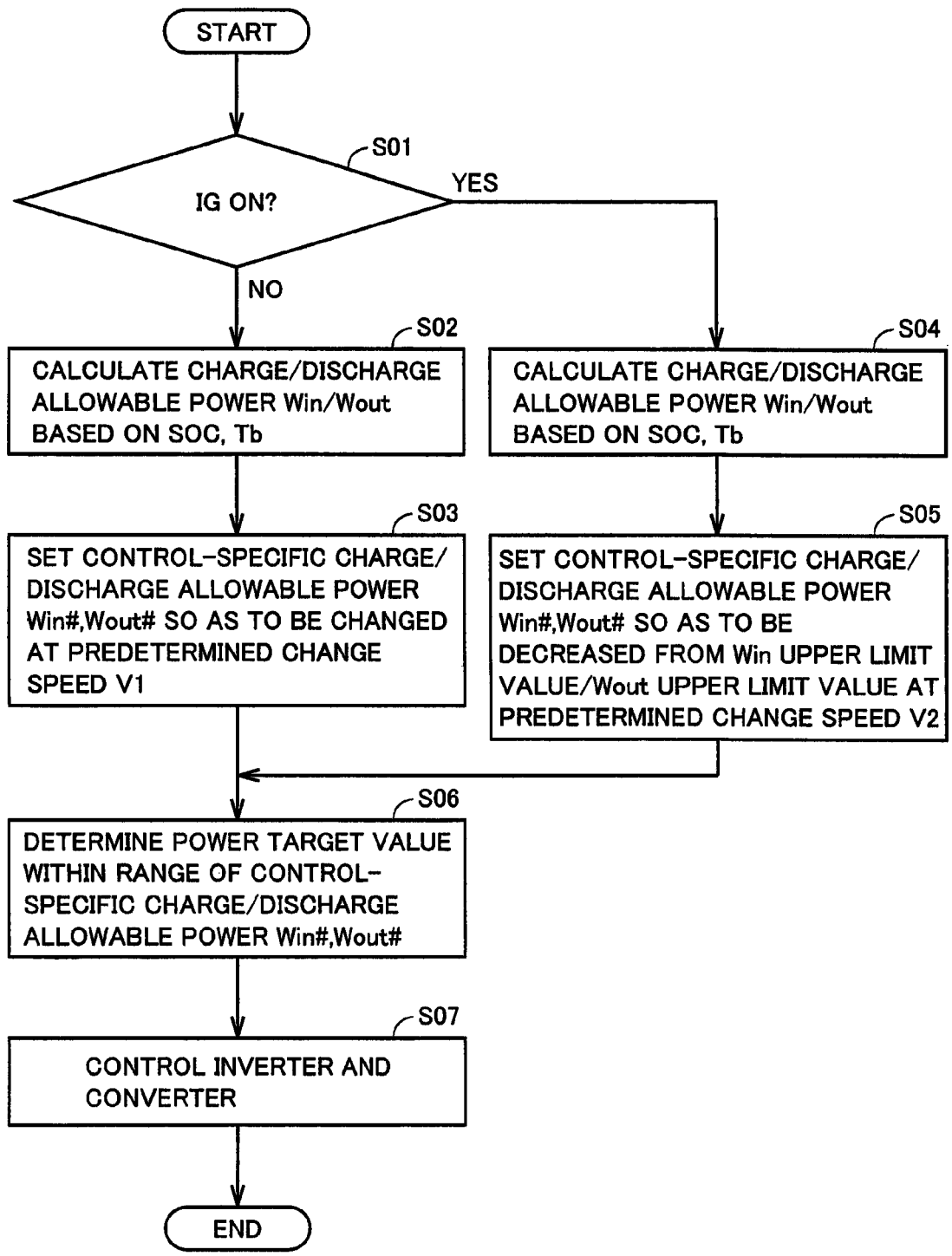

HYBRID VEHICLE AND METHOD OF CONTROLLING HYBRID VEHICLE

This is a 371 national phase application of PCT/JP2008/070092 filed 5 Nov. 2008, the content of which is incorporated herein by reference.

TECHNICAL FIELD

The present invention relates to a hybrid vehicle and a method of controlling the hybrid vehicle, and particularly to a technique for optimally managing the state of charge of a vehicle-mounted power storage unit.

BACKGROUND ART

In recent years, a hybrid vehicle having an effective combination of an engine and a motor for driving has been put into practical use as an environmentally-friendly vehicle. Such a hybrid vehicle is equipped with a power storage unit for supplying electric power to the motor serving as a driving source. The power storage unit supplies electric power to the motor at the time of start-up and acceleration and the like of the vehicle for generating driving force while collecting the kinetic energy of the vehicle as electric power at a downward slope, during braking, and the like.

The above-described charging and discharging for the power storage unit are performed, for example, in consideration of the state of charge (SOC) of the power storage unit. By maintaining the SOC in the appropriate range, overcharging and overdischarging of the power storage unit can be prevented.

For example, Japanese Patent Laying-Open No. 2006-101674 (Patent Document 1) discloses a charge/discharge control apparatus of the secondary battery which limits the charge/discharge power based on the state of the secondary battery in order to maintain the SOC of the secondary battery constituting a power storage unit in the appropriate range. According to this document, the charge/discharge control apparatus of the secondary battery includes estimating means for estimating the temperature of the secondary battery, and limiting means for limiting the charge/discharge power of the secondary battery based on the estimated temperature of the secondary battery. Furthermore, the charge/discharge control apparatus of the secondary battery calculates the estimated temperature of the secondary battery based on the state of the secondary battery detected by the sensor, and, based on this estimated temperature, sets the limited electric power corresponding to the limit value of the electric power at the time when the secondary battery is charged or discharged. Based on this limited electric power, the charge/discharge control for the secondary battery is performed.

Patent Document 1: Japanese Patent Laying-Open No. 2006-101674

DISCLOSURE OF THE INVENTION

Problems to be Solved by the Invention

According to the charge/discharge control apparatus of the secondary battery disclosed in the above-described Japanese Patent Laying-Open No. 2006-101674, the performance of the secondary battery can be achieved to the maximum extent by accurately estimating the state of the secondary battery and performing the charge/discharge control based on the state.

However, the limit value of the charge/discharge power is changed in accordance with the change in the state of the secondary battery. Accordingly, for example, in the case where the limit value of the charge/discharge power is decreased as the temperature of the secondary battery has exceeded a predetermined threshold value, the temperature rise of the secondary battery can be suppressed, but the electric power that can be output from the secondary battery may be abruptly decreased. Consequently, the driving force generated by the motor is abruptly decreased during vehicle running, which may cause a change in the driving force of the vehicle, thereby leading to deterioration of the drivability.

In contrast, at start-up of the system of the hybrid vehicle, the engine may be started in response to the request to perform a warm-up operation for promoting warm-up of the engine and the catalytic converter used for purifying the exhaust gas from the engine. In this case, the motor receives the electric power supplied from the secondary battery to perform a driving operation as an electric motor, and then, cranks the engine to be started. However, in the case where the secondary battery is used at a low temperature, the charge/discharge characteristics are degraded as compared with the case of the room temperature. Accordingly, the electric power supplied to the motor may promote deterioration of the secondary battery. This requires the charge/discharge power to be immediately limited for the purpose of protecting the secondary battery. Therefore, in order to control charging/discharging of the secondary battery, it is desirable to set the limit value of the charge/discharge power more properly in accordance with the state of the vehicle to output the electric power from the secondary battery more appropriately.

Thus, the present invention has been made in order to solve the above-described problems. An object of the present invention is to properly control charging/discharging of the power storage unit in accordance with the state of the hybrid vehicle, to thereby ensure the drivability while suppressing deterioration of the power storage unit.

Means for Solving the Problems

A hybrid vehicle according to an aspect of the present invention includes an internal combustion engine; a power generation unit capable of generating electric power by receiving power generated by an operation of the internal combustion engine; a power storage unit configured to be chargeable by receiving the electric power from the power generation unit; a driving force generation unit generating a driving force of a vehicle by receiving the electric power supplied from the power storage unit; and a control device controlling the driving force of the vehicle generated in response to a request from a driver and controlling the electric power charged and discharged in the power storage unit. The control device includes a power storage unit state detection unit detecting a state of charge and a temperature of the power storage unit; a charge/discharge allowable power calculation unit calculating charge/discharge power allowable in the power storage unit based on the state of charge and the temperature of the power storage unit detected by the power storage unit state detection unit; a charge/discharge allowable power control unit setting control-specific charge/discharge allowable power by correcting charge/discharge allowable power calculated by the charge/discharge allowable power calculation unit so as to limit the charge/discharge allowable power to be changed at a predetermined first change speed; and a charge/discharge control unit determining a power target value in accordance with the request from the driver within a range of the control-specific charge/discharge allowable power set by the charge/discharge allowable power control unit, and feedback-controlling the electric power charged and discharged in the power storage unit in accordance with the power target value. The charge/discharge allowable power control unit sets the control-specific charge/discharge allowable power such that, at start-up of the vehicle, a maximum value of the charge/discharge power allowable in the power storage unit is set as an initial value and the control-specific charge/discharge allowable power is decreased from the initial value at a predetermined second change speed higher than the first change speed.

Preferably, the first change speed is set below a change speed of the electric power charged and discharged in the power storage unit in accordance with the power target value. The second change speed is set higher than the change speed of the electric power charged and discharged in the power storage unit in accordance with the power target value.

According to another aspect of the present invention, a method of controlling a hybrid vehicle is provided. The hybrid vehicle includes an internal combustion engine, a power generation unit capable of generating electric power by receiving power generated by an operation of the internal combustion engine, a power storage unit configured to be chargeable by receiving the electric power from the power generation unit, and a driving force generation unit generating a driving force of a vehicle by receiving the electric power supplied from the power storage unit. The method of controlling the hybrid vehicle includes the steps of detecting a state of charge and a temperature of the power storage unit; calculating charge/discharge power allowable in the power storage unit based on the state of charge and the temperature of the power storage unit detected by the detecting step; setting control-specific charge/discharge allowable power by correcting charge/discharge allowable power calculated by the calculating step so as to limit the charge/discharge allowable power to be changed at a predetermined first change speed; and determining a power target value in accordance with a request from a driver within a range of the control-specific charge/discharge allowable power set by the setting step, and feedback-controlling the electric power charged and discharged in the power storage unit in accordance with the power target value. The setting step includes the step of setting the control-specific charge/discharge allowable power such that, at start-up of the hybrid vehicle, a maximum value of the charge/discharge power allowable in the power storage unit is set as an initial value and the control-specific charge/discharge allowable power is decreased from the initial value at a predetermined second change speed higher than the first change speed.

Preferably, the first change speed is set below a change speed of the electric power charged and discharged in the power storage unit in accordance with the power target value. The second change speed is set higher than the change speed of the electric power charged and discharged in the power storage unit in accordance with the power target value.

Effects of the Invention

According to the present invention, since the charge/discharge control of the power storage unit can be properly performed in accordance with the state of the hybrid vehicle, the drivability can be ensured while deterioration of the power storage unit can also be suppressed.

BRIEF DESCRIPTION OF THE DRAWINGS

FIG. 7 is a flowchart concerning the setting process of the control-specific charge/discharge allowable power according to the embodiment of the present invention.

DESCRIPTION OF THE REFERENCE SIGNS

Figure 1:
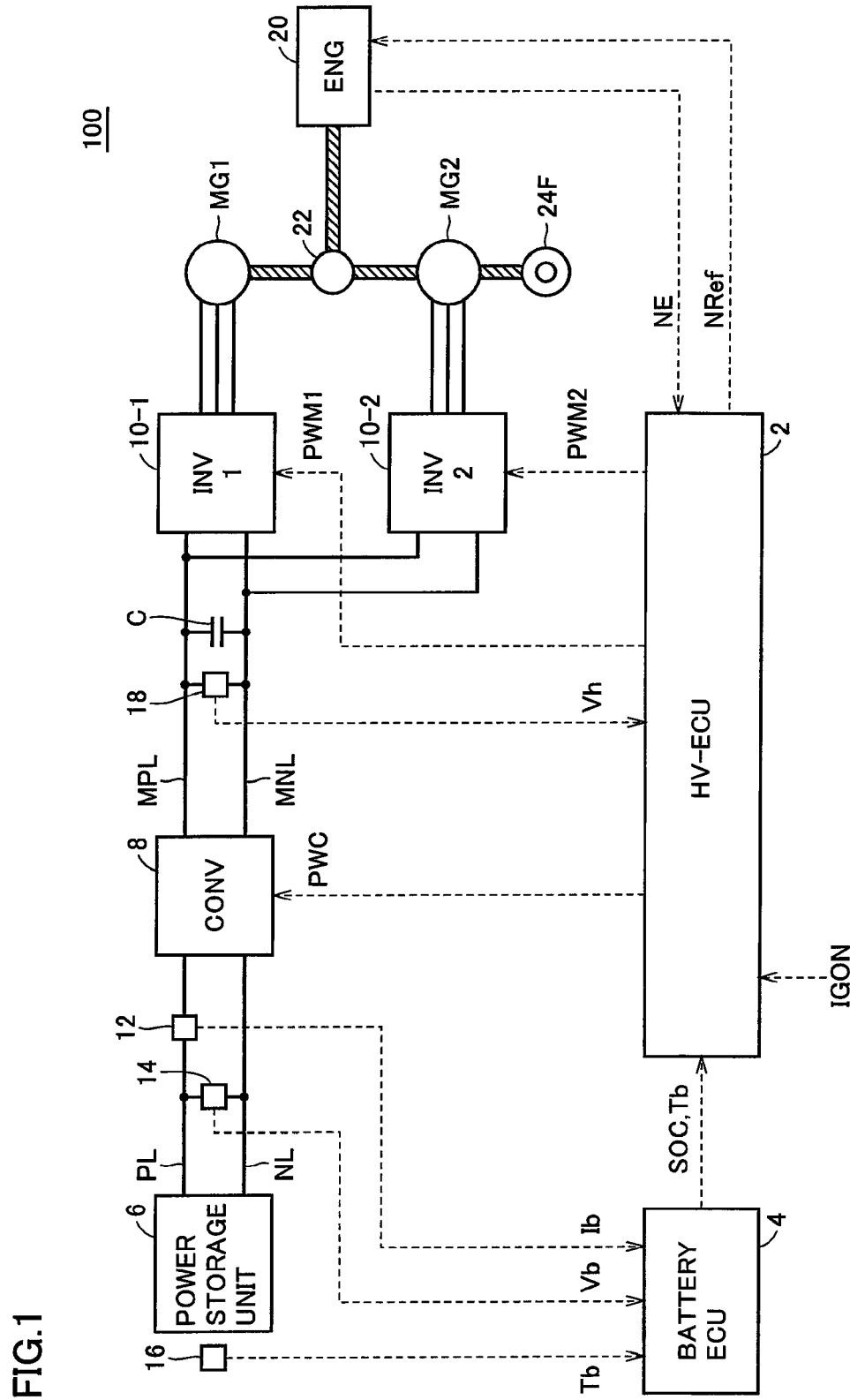
FIG. 1 is a schematic configuration diagram of a vehicle according to the embodiment of the present invention.

2 HV-ECU, 4 battery ECU, 6 power storage unit, 8 converter, 10-1, 10-2 inverter, 12 current detection unit, 14 voltage detection unit, 16 temperature detection unit, 20 engine, 22 power split device, 24F driving wheel, 100 vehicle, 200 charge/discharge allowable power calculation unit, 202 charge/discharge allowable power control unit, 204 output management unit, 206 distribution unit, 208 converter control unit, 210 inverter control unit, MG1 first motor generator, MG2 second motor generator, MNL negative bus, MPL positive bus, PL positive line, NL negative line.

BEST MODES FOR CARRYING OUT THE INVENTION

Embodiments of the present invention will be hereinafter described in detail with reference to the accompanying drawings, in which the same or corresponding components are designated by the same reference characters.

FIG. 1 is a schematic configuration diagram of a vehicle 100 according to the embodiment of the present invention.

Referring to FIG. 1, vehicle 100 according to the embodiment of the present invention that is representatively a hybrid vehicle is equipped with an internal combustion engine (engine) and an electric motor (motor generator), and controls the driving force from each of the internal combustion engine and the electric motor in the optimal ratio for driving.

Specifically, vehicle 100 includes an engine (ENG) 20, a first motor generator MG1, and a second motor generator MG2 each as a driving force source, which are mechanically coupled to each other through a power split device 22. By way of example, power split device 22 includes a planetary gear mechanism consisting of three elements including a planetary carrier, a sun gear and a ring gear, to which engine 20, first motor generator MG1 and second motor generator MG2 are connected, respectively. In accordance with the running condition of vehicle 100, the driving force is distributed and combined among the above-described three elements through power split device 22, with the result that a driving wheel 24F is driven.

During running of vehicle 100, power split device 22 divides the driving force generated by the operation of engine 20 into two driving forces, one of which is distributed to first motor generator MG1 and the other of which is distributed to second motor generator MG2. The driving force distributed from power split device 22 to first motor generator MG1 is used for the operation for power generation. In contrast, the driving force distributed to second motor generator MG2 is combined with the driving force generated in second motor generator MG2 and used to drive driving wheel 24F.

In this case, a first inverter (INV1) 10-1 and a second inverter (INV2) 10-2 associated with motor generators MG1 and MG2, respectively, perform mutual conversion between a direct-current (DC) power and an alternating-current (AC) power. In response to a switching command PWM1 from HV-ECU 2, first inverter 10-1 mainly converts the AC power generated in first motor generator MG1 into a DC power, and supplies the DC power to a positive bus MPL and a negative bus MNL. In contrast, in response to a switching command PWM2 from HV-ECU 2, second inverter 10-2 converts the DC power supplied through positive bus MPL and negative bus MNL into an AC power, and supplies the AC power to second motor generator MG2. In other words, vehicle 100 includes second motor generator MG2 capable of generating driving force by receiving the electric power from a power storage unit 6 as a load device and first motor generator MG1 capable of generating electric power by receiving the driving force from engine 20.

Power storage unit 6 serving as a chargeable and dischargeable power storing element is representatively formed of a secondary battery such as a lithium ion battery and a nickel-metal hydride battery, or a power storage device such as an electric double layer capacitor. Furthermore, a converter (CONV) 8 capable of mutually converting the DC voltage is provided between power storage unit 6 and first inverter 10-1. Converter (CONV) 8 serves to mutually boost or lower the input/output voltage of power storage unit 6 and the line voltage between positive bus MPL and negative bus MNL. The voltage boosting and lowering operation in converter 8 is controlled in accordance with a switching command PWC from HV-ECU 2.

Although FIG. 1 shows the vehicle equipped with only a single power storage unit 6, the number of power storage units 6 is not limited thereto. Depending on the running performance and the like required for vehicle 100, the configuration equipped with a plurality of power storage units may be employed. In this case, it is preferable to employ the configuration equipped with the same number of converters 8 so as to correspond to the power storage units.

Furthermore, a current detection unit 12 interposed into a positive line PL detects a current value Vb transmitted and received between power storage unit 6 and converter 8. A voltage detection unit 14 connected between positive line PL and a negative line NL detects a voltage value Vb associated with charging or discharging of power storage unit 6. Furthermore, a temperature detection unit 16 is disposed in proximity to the battery cell forming power storage unit 6 and detects a temperature Tb of power storage unit 6. It is to be noted that temperature detection unit 16 may be configured to output a representative value obtained from the detected value by a plurality of temperature detecting elements arranged so as to correspond to a plurality of battery cells constituting power storage unit 6.

Each of parts constituting vehicle 100 is implemented by cooperative control of HV-ECU 2 and a battery ECU 4. HV-ECU 2 and battery ECU 4 are connected to each other through a communication line, which allows transmission and reception of various pieces of information and signals therebetween.

Battery ECU 4 mainly serves as a control device that is responsible for management of the state of charge of power storage unit 6 and detection of failures. By way of example, battery ECU 4 is configured to have a microcomputer as a main body including a CPU (Central Processing Unit) and a storage unit such as a ROM (Read Only Memory) and a RAM (Random Access Memory). Specifically, battery ECU 4 calculates a state of charge (hereinafter abbreviated as "SOC") of power storage unit 6 based on temperature Tb detected by temperature detection unit 16, voltage value Vb detected by voltage detection unit 14, and current value Ib detected by current detection unit 12. The state of charge (SOC) shows a charging amount (remaining charge amount) with reference to the fully charged state of power storage unit 6, and is represented by the ratio (0% to 100%) of the present charging amount with respect to the full charge capacity, by way of example. Battery ECU 4 transmits the calculated SOC of power storage unit 6 to HV-ECU 2 together with temperature Tb detected by temperature detection unit 16.

During running of vehicle 100, HV-ECU 2 serves as a control device for controlling engine 20, converter 8, inverters 10-1, 10-2 and motor generators MG1, MG2 in order to generate a driving force of the vehicle in response to the request from the driver. By way of example, HV-ECU 2 is configured to have a microcomputer as a main body including a CPU and a storage unit such as a ROM and a RAM. In addition to the control of this vehicle driving force, HV-ECU 2 controls the electric power charged and discharged in power storage unit 6.

Particularly, vehicle 100 according to the present embodiment is a hybrid vehicle, and HV-ECU 2 sequentially switches between the EV (Electric Vehicle) running mode and the HV (Hybrid Vehicle) running mode for performing a control operation. In other words, when an ignition ON command IGON is given by the operation of the driver, HV-ECU 2 switches between the EV running mode and the HV running mode such that the SOC of power storage unit 6 is maintained within the predetermined range.

In the EV running mode, the vehicle is mainly controlled to run only with the driving force from second motor generator MG2. Accordingly, the operation for generating electric power is not performed in first motor generator MG1 which has received the power of engine 20, and the charging of power storage unit 6 by first motor generator MG1 is limited. For that reason, even in the case where power storage unit 6 may be charged by the regenerative operation of second motor generator MG2, it is inevitable that the SOC of power storage unit 6 is decreased. Consequently, when the SOC of power storage unit 6 falls below a predetermined value, HV-ECU 2 shifts the running mode to the HV running mode in which charging of power storage unit 6 by first motor generator MG1 is allowed.

Furthermore, there may be cases in the EV running mode where the driver gives a request for driving force for sudden acceleration and the like, where a request is given that is irrelevant to the request for driving force such as a request for catalyst warm-up and air conditioning, and also where other conditions are satisfied. In such cases, HV-ECU 2 starts engine 20 and shifts the mode to the HV running mode.

In the HV running mode, HV-ECU 2 determines the target value about each of the rotation speed of engine 20, the amount of electric power generated by first motor generator MG1 and the torque of second motor generator MG2 based on the signal from each sensor, the running conditions, the accelerator pedal position (which are not shown) and the like, so as to achieve optimization of overall fuel consumption efficiency.

When each target value is determined, the SOC of power storage unit 6 is also taken into consideration, in which case the electric power charged and discharged in power storage unit 6 is controlled such that the SOC of power storage unit 6 is maintained within the predetermined range. In other words, the difference between the electric power generated by first motor generator MG1 receiving a part of the power from engine 20 and the electric power consumption used by second motor generator MG2 for generating driving force is equivalent to the charge/discharge power in power storage unit 6. Accordingly, the amount of electric power generated by first motor generator MG1 and the electric power consumption of second motor generator MG2 are determined depending on the level of the SOC of power storage unit 6.

[Charge/Discharge Management of Power Storage Unit]

Hereinafter described will be the control structure for performing charge/discharge management of power storage unit 6 in the HV running mode in accordance with the above-described SOC of power storage unit 6.

Figure 2:
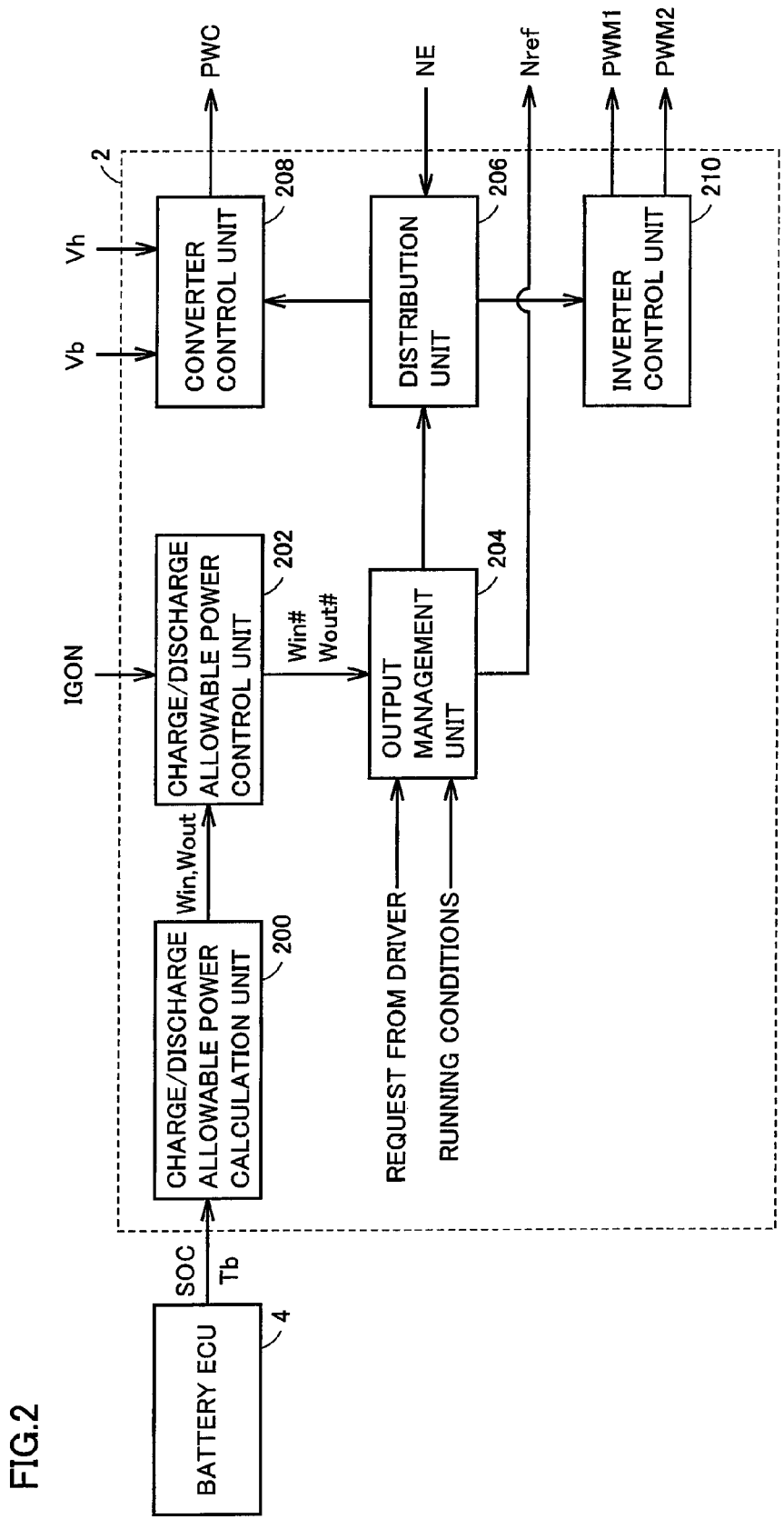
FIG. 2 is a block diagram showing the control structure in an HV-ECU according to the embodiment of the present invention.

FIG. 2 is a block diagram showing the control structure in HV-ECU 2 according to the embodiment of the present invention.

Referring to FIG. 2, the control structure in HV-ECU 2 includes a charge/discharge allowable power calculation unit 200, a charge/discharge allowable power control unit 202, an output management unit 204, a distribution unit 206, a converter control unit 208, and an inverter control unit 210.

When charge/discharge allowable power calculation unit 200 receives the SOC and temperature Tb of power storage unit 6 from battery ECU 4, it calculates the electric power allowed to be charged and discharged in power storage unit 6 (charge allowable power Win and discharge allowable power Wout).

Figure 3:
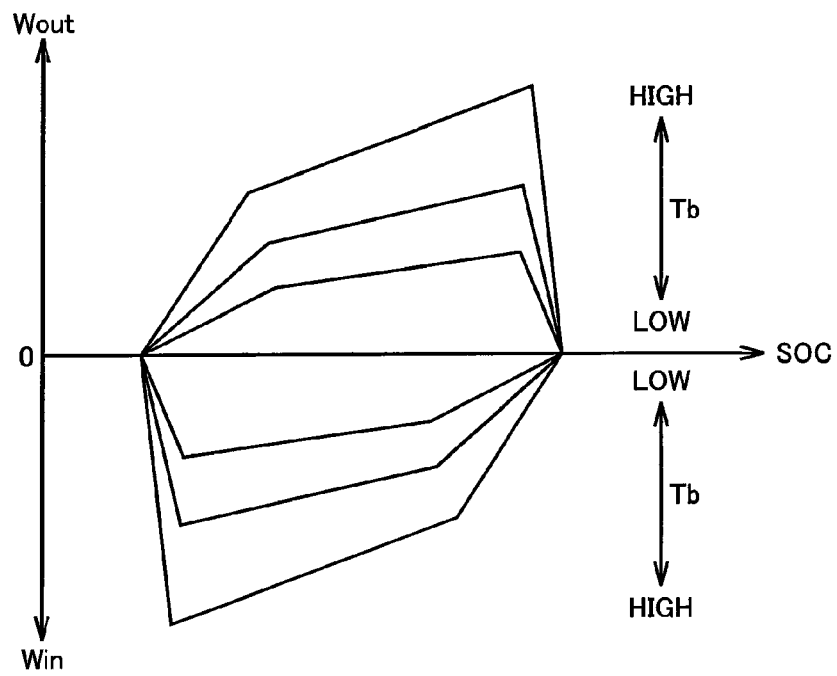
FIG. 3 is a diagram of an example of the charge/discharge allowable power characteristics of a power storage unit.

Specifically, charge/discharge allowable power calculation unit 200 stores the charge/discharge allowable power characteristics that are defined in the map format in which charge allowable power Win and discharge allowable power Wout are associated in accordance with the SOC and temperature Tb of power storage unit 6. FIG. 3 is a diagram of an example of the charge/discharge allowable power characteristics. Charge/discharge allowable power calculation unit 200 refers to the map (FIG. 3) stored based on the SOC and temperature Tb of power storage unit 6 at each point of time and transmits corresponding charge allowable power Win and discharge allowable power Wout to charge/discharge allowable power control unit 202.

Charge/discharge allowable power control unit 202 sets control-specific charge allowable power Win# in accordance with charge allowable power Win. Furthermore, charge/discharge allowable power control unit 202 sets control-specific discharge allowable power Wout# in accordance with discharge allowable power Wout. It is to be noted that control-specific charge/discharge allowable power Win#/Wout# is used as charge/discharge allowable power for power storage unit 6 when output management unit 204 determines each target value of the amount of electric power generated by first motor generator MG1 and the electric power consumption in second motor generator MG2. In the present embodiment, control-specific charge/discharge allowable power Win#/Wout# is set by correcting charge/discharge allowable power Win/Wout calculated based on the SOC and temperature Tb of power storage unit 6 at each point of time so as to limit the change speed of charge/discharge allowable power Win/Wout.

Figure 4:
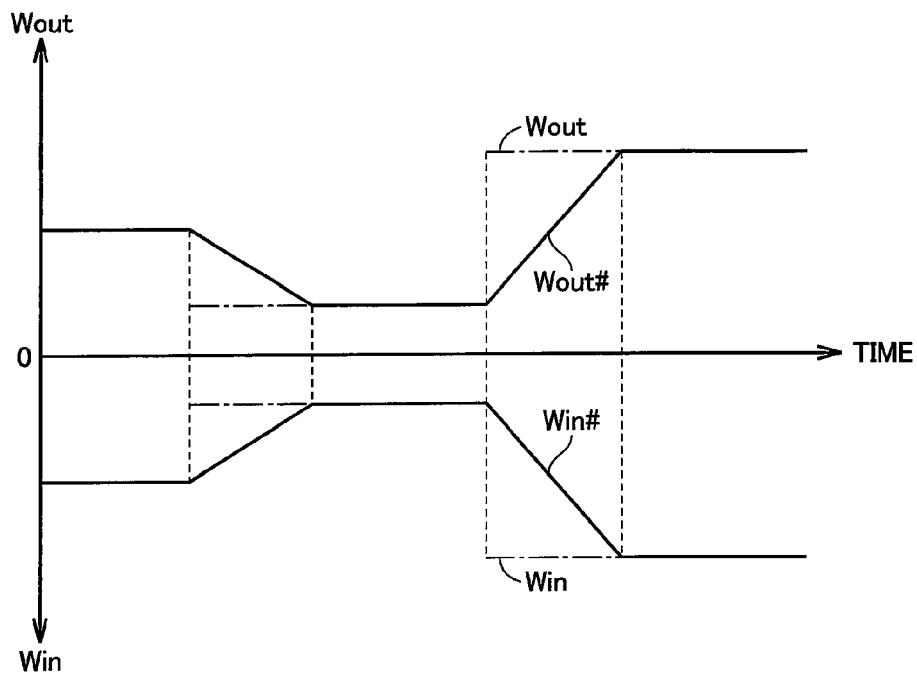
FIG. 4 is a diagram showing the temporal change of control-specific charge/discharge allowable power.

FIG. 4 is a diagram showing the temporal change of control-specific charge/discharge allowable power Win#/Wout#. In addition, the solid line in the figure shows control-specific charge/discharge allowable power Win#/Wout#, and the alternate long and short dash line in the figure shows charge/discharge allowable power Win/Wout at each point of time.

Referring to FIG. 4, charge/discharge allowable power Win/Wout at each point of time is changed (increased or decreased) over time in accordance with the SOC and temperature Tb of power storage unit 6. For example, in the case where temperature Tb of power storage unit 6 exceeds a predetermined threshold value, charge allowable power Win and discharge allowable power Wout each are decreased in order to lower the charging/discharging current to suppress the temperature rise in power storage unit 6. Furthermore, in the case where temperature Tb of power storage unit 6 is relatively low, the charge/discharge characteristics are degraded as compared with the case of the room temperature. Accordingly, in order to avoid overcharging and overdischarging, charge allowable power Win and discharge allowable power Wout each are decreased.

Consequently, in the case of the configuration in which motor generators MG1 and MG2 are controlled in accordance with the above-described decreased charge/discharge allowable power Win/Wout, the electric power charged and discharged in power storage unit 6 is limited within the range of charge/discharge allowable power Win/Wout. Therefore, the temperature rise, overcharging, overdischarging and the like in power storage unit 6 can be suppressed. On the other hand, the vehicle driving force produced from engine 20 and second motor generator MG2 is abruptly reduced, which may cause the driver discomfort. Furthermore, a variation in the vehicle driving force is caused, which may deteriorate the drivability.

Thus, for the purpose of preventing such deterioration of the drivability, when charge/discharge allowable power Win/Wout is changed in accordance with the SOC and temperature Tb of power storage unit 6 as shown in FIG. 4, charge/discharge allowable power control unit 202 sets control-specific charge/discharge allowable power Win#/Wout# by correcting charge/discharge allowable power Win/Wout to limit its change speed to a predetermined change speed V1 defined in advance.

In addition, in consideration of the fact that the electric power charged and discharged in power storage unit 6 is feedback-controlled in accordance with each target value of the rotation speed of engine 20, the amount of electric power generated by first motor generator MG1 and the torque of second motor generator MG2, this predetermined change speed V1 is set so as not to exceed the change speed of the electric power charged and discharged in power storage unit 6 in this feedback-control operation. This allows suppression of the variation in the vehicle driving force that results from an abrupt change in charge/discharge allowable power Win/Wout. Consequently, the deterioration of the drivability can be prevented.

Again referring to FIG. 2, when output management unit 204 receives control-specific charge/discharge allowable power Win#/Wout# from charge/discharge allowable power control unit 202, it determines the power target value in accordance with the request from the driver and the running conditions to fall within the range of control-specific charge/discharge allowable power Win#/Wout#. Then, output management unit 204 provides the power target value to distribution unit 206. It is to be noted that the request from the driver includes the stepping amount of the accelerator pedal, the stepping amount of the brake pedal, the position of the shift lever, and the like (which are not shown). Furthermore, the running conditions include the information and the like indicating that vehicle 100 is under acceleration or deceleration.

Furthermore, output management unit 204 determines an output command Nref to engine 20 together with the power target value in order to generate the vehicle driving force in accordance with the request from the driver.

Based on a rotation speed NE of engine 20, distribution unit 206 distributes the power target value determined by output management unit 204, and calculates an MG1 power generation target value for first motor generator MG1 and an MG2 torque target value for second motor generator MG2. Then, distribution unit 206 outputs the control command in accordance with each of the calculated MG1 power generation target value and the MG2 torque target value to inverter control unit 210 and also outputs the control command in accordance with the supply and demand of electric power within vehicle 100 to converter control unit 208.

In response to the control command from distribution unit 206, inverter control unit 210 generates switching commands PWM1 and PWM2 for driving motor generators MG1 and MG2. These switching commands PWM1 and PWM2 are output to inverters 10-1, and 10-2, respectively.

In response to the control command from distribution unit 206, converter control unit 208 generates switching command PWC such that the predetermined discharge power is supplied from power storage unit 6 to second motor generator MG2. This switching command PWC is output to converter 8. The discharge power of power storage unit 6 is controlled by converter 8 performing a voltage conversion operation in accordance with switching command PWC.

As described above, HV-ECU 2 sets control-specific charge/discharge allowable power Win#/Wout# by correcting charge/discharge allowable power Win/Wout in accordance with the SOC and temperature Tb of power storage unit 6 to limit the change speed of charge/discharge allowable power Win/Wout. Then, HV-ECU 2 controls the amount of electric power generated by first motor generator MG1 and the electric power consumption of second motor generator MG2 to fall within the range of control-specific charge/discharge allowable power Win#/Wout# set as described above. According to the control configuration as described above, overdischarging and overcharging of power storage unit 6 can be prevented by maintaining the predetermined range of the SOC of power storage unit 6 while ensuring the drivability.

However, in the case where the above-described control configuration is applied also at start-up of the system of vehicle 100 (at the time when IG is ON), there may be a possibility that, in accordance with the control performed for starting engine 20, the electric power charged and discharged in power storage unit 6 exceeds the original charge/discharge allowable power of power storage unit 6 that is limited based on the SOC and temperature Tb of power storage unit 6, that is, the electric power limitation is exceeded, as will be described below.

Figure 5:
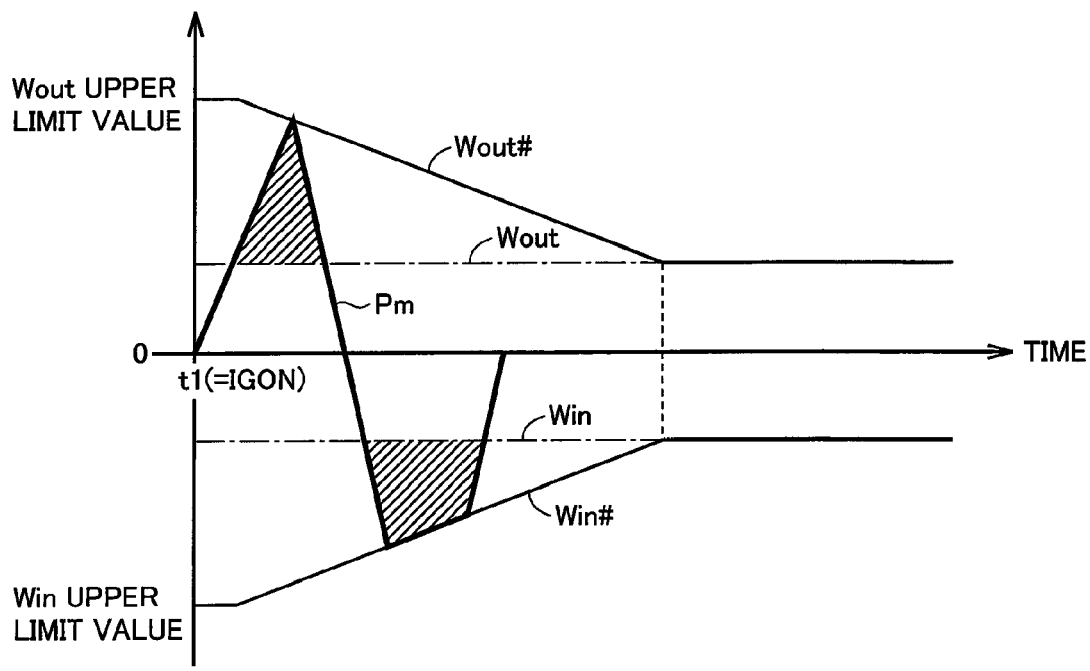
FIG. 5 is a diagram of an example illustrating that the electric power limitation is exceeded which occurs in the power storage unit.

FIG. 5 is a diagram of an example illustrating that the electric power limitation is exceeded which occurs in power storage unit 6.

Referring to FIG. 5, at a time t1, it is assumed that ignition ON command IGON is given by the operation of the driver. At this time t1, control-specific charge/discharge allowable power Win#/Wout# of power storage unit 6 is set at the maximum value of the charge/discharge allowable power characteristics shown in FIG. 3. In FIG. 5, the maximum value of the charge allowable power of the charge/discharge allowable power characteristics is described as a Win upper limit value and the maximum value of the discharge allowable power thereof is described as a Wout upper limit value.

In this way, the limitation on the electric power charged and discharged in power storage unit 6 is cancelled at time t1. This is because HV-ECU 2 is usually configured to determine, within a certain period of time from the timing at which ignition ON command IGON was given, whether or not a failure occurs in each sensor, and, when it is determined that each sensor normally operates, to detect the SOC, temperature Tb and the like of power storage unit 6 based on this sensor output, which prevents accurate calculation of charge/discharge allowable power Win/Wout at time t1 when ignition ON command IGON was given. For this reason, control-specific charge/discharge allowable power Win#/Wout# at time t1 is uniformly fixed at the maximum value (Win upper limit value and Wout upper limit value) of the charge/discharge allowable power characteristics of power storage unit 6, thereby preventing possible malfunctions such as start-up of engine 20 in accordance with the erroneous determination that it is in the low charge state in spite of the fact that power storage unit 6 stores sufficient electric power for the EV running.

Then, after time t1, HV-ECU 2 sets control-specific charge/discharge allowable power Win#/Wout# such that the Win upper limit value and the Wout upper limit value each set as an initial value are decreased at the above-described predetermined change speed V1. Consequently, control-specific charge/discharge allowable power Win#/Wout# is decreased at predetermined change speed V1 until it reaches charge/discharge allowable power Win/Wout calculated based on the SOC and temperature Tb of power storage unit 6.

In this case, since vehicle 100 is a hybrid vehicle, it is equipped with a catalytic converter for purifying the exhaust gas from engine 20 as in the case of the vehicle provided only with a conventional engine as a driving force source. Accordingly, at start-up of the system of vehicle 100 in the low temperature environment, a warm-up request for promoting warm-up of engine 20 or a catalytic converter may be issued. When the control for starting engine 20 is started in response to this warm-up request, HV-ECU 2 determines each target value of the torque of first motor generator MG1 and the amount of electric power generated by second motor generator MG2 to fall within the range of control-specific charge/discharge allowable power Win#/Wout#. Then, HV-ECU 2 feedback-controls the electric power charged and discharged in power storage unit 6 in accordance with the determined target values.

Specifically, when performing the control for starting engine 20, first motor generator MG1 is used as a starter which serves to start engine 20. Accordingly, HV-ECU 2 calculates the torque target value for driving first motor generator MG1 to fall within the range of control-specific discharge allowable power Wout# such that the rotation speed of engine 20 is set at an idle rotation speed. Consequently, first motor generator MG1 receives the electric power supplied from power storage unit 6 to perform a driving operation as an electric motor, and then, cranks engine 20 to be started through power split device 22.

In this case, at the time of start-up of engine 20, the rotation speed is relatively low, which causes a relatively large torque variation. This torque variation of engine 20 causes a change in the driving torque of vehicle 100 across the zero point. Consequently, power split device 22 including a planetary gear mechanism undergoes backlash in the gear to thereby produce rattling noise, which may be less comfortable. Therefore, in the case where the above-described rattling noise may occur, HV-ECU 2 changes the torque of second motor generator MG2 so as to prevent production of the rattling noise.

Specifically, in the case where the driving torque of vehicle 100 falls within the range of the rattling noise producing torque region that is defined in advance, HV-ECU 2 changes the torque of second motor generator MG2 such that the driving torque is out of the rattling noise producing torque region. As an example, HV-ECU 2 controls second motor generator MG2 to be operated in the regenerative mode so as to reduce the backlash of the gear to thereby reduce the rattling noise.

In this case, HV-ECU 2 calculates a MG2 power generation target value for second motor generator MG2 within the range of control-specific charge allowable power Win#. Then, HV-ECU 2 feedback-controls the electric power supplied to power storage unit 6 in accordance with the calculated target value. This prevents rattling noise from occurring in power split device 22 due to the torque variation in engine 20.

In the above-described control sequence for starting engine 20, the electric power charged and discharged in power storage unit 6 (equivalent to Pm in FIG. 5) is controlled in accordance with control-specific charge/discharge allowable power Win#/Wout#. However, in the case where power storage unit 6 is at a low temperature or in the low charge state at start-up of the system of vehicle 100, charge/discharge allowable power Win/Wout of power storage unit 6 is remarkably limited in accordance with the charge/discharge allowable power characteristics in FIG. 3. While FIG. 5 shows control-specific charge/discharge allowable power Win#/Wout# (corresponding to a solid line) and charge/discharge allowable power Win/Wout (corresponding to an alternate long and short dash line) in accordance with the SOC and temperature Tb of power storage unit 6, it is apparent that there is a significant difference therebetween in the case where power storage units 6 is at a low temperature and in the low charge state. Accordingly, when the above-described control operation for starting engine 20 is performed within the range of control-specific charge/discharge allowable power Win#/Wout#, power storage unit 6 is charged/discharged with the electric power exceeding the original charge/discharge allowable power Win/Wout. Consequently, the limitation on the electric power may be exceeded in the diagonally shaded region in FIG. 5. This may cause overcharging and overdischarging of power storage unit 6.

Figure 6:
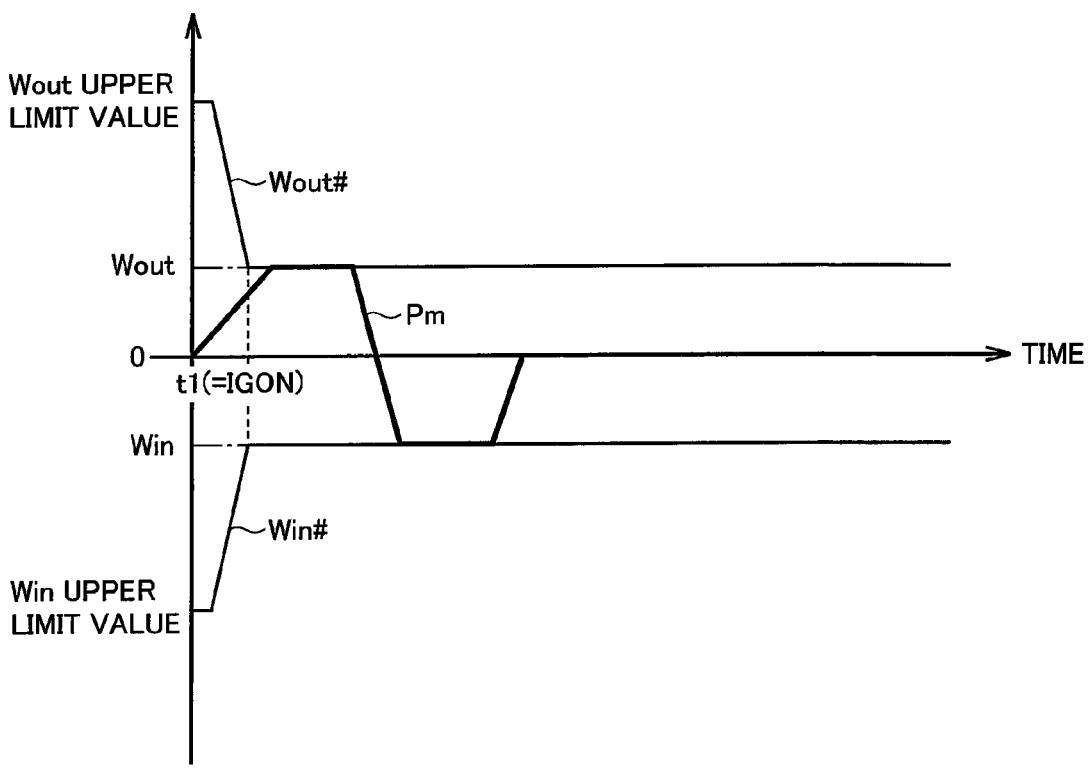
FIG. 6 is a diagram showing the temporal change of the control-specific charge/discharge allowable power according to the embodiment of the present invention.

Thus, in order to avoid the above-described failures, the present embodiment is configured such that the limitation on the change speed of control-specific charge/discharge allowable power Win#/Wout# is cancelled at start-up of the system of vehicle 100. FIG. 6 is a diagram showing the temporal change of control-specific charge/discharge allowable power Win#/Wout# according to the embodiment of the present invention. It is to be noted that the solid line in the figure shows control-specific charge/discharge allowable power Win#/Wout#, and the alternate long and short dash line in the figure shows charge/discharge allowable power Win/Wout at each point of time.

Referring to FIG. 6, at time t1, ignition ON command IGON is given by the operation of the driver. At this time t1, control-specific charge/discharge allowable power Win#/Wout# of power storage unit 6 is set at the maximum value (a Win upper limit value and a Wout upper limit value) of the charge/discharge allowable power characteristics shown in FIG. 3. In addition, the limitation on the electric power charged and discharged in power storage unit 6 is cancelled at time t1 for the same reasons as described in FIG. 5. In other words, control-specific charge/discharge allowable power Win#/Wout# at time t1 is uniformly fixed at the maximum value of the charge/discharge allowable power characteristics of power storage unit 6, thereby preventing possible malfunctions such as start-up of engine 20 in accordance with the erroneous determination that it is in the low charge state in spite of the fact that power storage unit 6 stores sufficient electric power for the EV running.

Then, after time t1, HV-ECU 2 sets control-specific charge/discharge allowable power Win#/Wout# such that the Win upper limit value and the Wout upper limit value each defined as an initial value are decreased. In this case, HV-ECU 2 sets control-specific charge/discharge allowable power Win#/Wout# such that control-specific charge/discharge allowable power Win#/Wout# is decreased at a predetermined change speed V2 (>V1) higher than the above-described predetermined change speed V1. In addition, the predetermined change speed V2 is set at a value higher than the change speed of the electric power charged and discharged in power storage unit 6 in the feedback control in accordance with the power target value in response to the request from the driver.

When controlling the electric power charged and discharged in power storage unit 6 in accordance with control-specific charge/discharge allowable power Win#/Wout# set as described above, as shown in FIG. 6, electric power Pm charged and discharged in power storage unit 6 during a series of control operations for starting the engine is maintained within the range of the original charge/discharge allowable power Win/Wout. Consequently, overcharging and overdischarging of power storage unit 6 can be prevented.

Thus, the limitation on the change speed of control-specific charge/discharge allowable power Win#/Wout# is cancelled at start-up of the system in vehicle 100. This is because it is less necessary to ensure the drivability at start-up of the system as compared with the case where vehicle 100 is running. In other words, while vehicle 100 is running, it is effective to limit the change speed of control-specific charge/discharge allowable power Win#/Wout# for the purpose of preventing an abrupt change in the vehicle driving force resulting from the change in the charge/discharge allowable power. In contrast, since no abrupt change of the vehicle driving force occurs at start-up of the system of vehicle 100, it is less effective to limit the change speed of control-specific charge/discharge allowable power Win#/Wout#. Therefore, in such a case, when the limitation on the change speed is cancelled, it becomes possible to effectively prevent the limitation on the electric power for power storage unit 6 from being exceeded due to the control for starting engine 20.

With regard to the correspondence relationship between the embodiment of the present invention shown in FIG. 2 and the invention of the present application, a power storage unit 6 corresponds to a "power storage unit", an engine 20 corresponds to an "internal combustion engine", a first motor generator MG1 corresponds to a "power generation unit", a second motor generator MG2 corresponds to a "driving force generation unit", and a battery ECU 4 and an HV-ECU 2 each correspond to a "control device". Furthermore, battery ECU 4 implements a "power storage unit state detection unit" and HV-ECU 2 implements a "charge/discharge allowable power calculation unit", a "charge/discharge allowable power control unit" and a "charge/discharge control unit".

The above-described processes can be summarized to a process flow as shown in FIG. 7.

FIG. 7 is a flowchart concerning the setting process of control-specific charge/discharge allowable power Win#/Wout# according to the embodiment of the present invention. In addition, the flowchart shown in FIG. 7 can be implemented by executing the program stored in advance in HV-ECU 2 and battery ECU 4.

Referring to FIG. 7, HV-ECU 2 first determines whether or not vehicle 100 is under start-up of the system. Specifically, HV-ECU 2 determines whether or not ignition ON command IGON has been issued by the operation of the driver (step S01). If ignition ON command IGON has not been issued (NO in step S01), that is, vehicle 100 is not under start-up of the system, HV-ECU 2 refers to the map (FIG. 3) stored based on the SOC and temperature Tb of power storage unit 6 at each point of time provided from battery ECU 4 and then calculates charge/discharge allowable power Win/Wout of power storage unit 6 (step S02).

Then, HV-ECU 2 sets control-specific charge/discharge allowable power Win#/Wout# by correcting charge/discharge allowable power Win/Wout of power storage unit 6 calculated in step S02 in order to limit its change speed to a predetermined change speed V1 set in advance (step S03).

In contrast, when ignition ON command IGON has been issued in step S01 (YES in step S01), that is, when vehicle 100 is under start-up of the system, HV-ECU 2 refers to the map (FIG. 3) stored based on the SOC and temperature Tb of power storage unit 6 at each point of time provided from battery ECU 4 and then calculates charge/discharge allowable power Win/Wout of power storage unit 6 (step S04). Then, HV-ECU 2 sets control-specific charge/discharge allowable power Win#/Wout# such that the Win upper limit value and the Wout upper limit value each defined as an initial value are decreased to charge/discharge allowable power Win/Wout calculated in step S04 at the predetermined change speed V2 higher than the predetermined change speed V1 (step S05).

Then, when HV-ECU 2 determines each power target value in accordance with the request from the driver and the running conditions to fall within the range of control-specific charge/discharge allowable power Win#/Wout# set in steps S03 and S05 (step S06), it distributes the determined power target values and calculates the MG1 power generation target value for first motor generator MG1 and the MG2 torque target value for second motor generator MG2. Then, HV-ECU 2 outputs the control command in accordance with each of the calculated MG1 power generation target value and MG2 torque target value to inverter control unit 210 and also outputs the control command in accordance with the supply and demand of the electric power within vehicle 100 to converter control unit 208 (step S07).

As described above, according to the embodiments of the present invention, the control-specific charge/discharge allowable power is set by making a correction for its change speed to the charge/discharge allowable power calculated based on the state of the power storage unit, in which configuration the change speed is set variably in accordance with the state of the vehicle. Accordingly, the deterioration of the drivability can be suppressed during running of the vehicle, while the deterioration of the power storage unit can also be suppressed at start-up of the vehicle. Consequently, the drivability can be ensured while the deterioration of the power storage unit can be suppressed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be applied to a hybrid vehicle equipped with a chargeable and dischargeable power storage unit.

The invention claimed is:

1. A hybrid vehicle comprising:
an internal combustion engine;
a power generation unit capable of generating electric power by receiving power generated by an operation of said internal combustion engine;
a power storage unit configured to be chargeable by receiving the electric power from said power generation unit;
a driving force generation unit generating a driving force of a vehicle by receiving the electric power supplied from said power storage unit; and
a control device controlling the driving force of the vehicle generated in response to a request from a driver and controlling the electric power charged and discharged in said power storage unit,
said control device including
a power storage unit state detection unit detecting a state of charge and a temperature of said power storage unit,
a charge/discharge allowable power calculation unit calculating charge/discharge power allowable in said power storage unit based on the state of charge and the temperature of said power storage unit detected by said power storage unit state detection unit,
a charge/discharge allowable power control unit setting control-specific charge/discharge allowable power by correcting charge/discharge allowable power calculated by said charge/discharge allowable power calculation unit so as to limit the charge/discharge allowable power to be changed at a predetermined first change speed and,
a charge/discharge control unit determining a power target value in accordance with the request from the driver within a range of said control-specific charge/discharge allowable power set by said charge/discharge allowable power control unit, and feedback-controlling the electric power charged and discharged in said power storage unit in accordance with the power target value,
said charge/discharge control unit is configured to perform control for starting said internal combustion engine in response to a request at start-up of said hybrid vehicle within said range of said control-specific charge/discharge allowable power,
when performing said control for said internal combustion engine, said internal combustion engine is started by receiving the electric power supplied from said power storage unit and said driving force generation unit is operated in regenerative mode so as to reduce rattling noise,
said charge/discharge allowable power control unit setting said control-specific charge/discharge allowable power such that, at start-up of said vehicle, a maximum value of the charge/discharge power allowable in said power storage unit is set as an initial value and the control-specific charge/discharge allowable power is decreased from the initial value at a predetermined second change speed higher than said first change speed.

2. The hybrid vehicle according to claim 1, wherein said first change speed is set below a change speed of the electric power charged and discharged in said power storage unit in accordance with said power target value, and
said second change speed is set higher than the change speed of the electric power charged and discharged in said power storage unit in accordance with said power target value.

3. A method of controlling a hybrid vehicle,
said hybrid vehicle including
an internal combustion engine,
a power generation unit capable of generating electric power by receiving power generated by an operation of said internal combustion engine,
a power storage unit configured to be chargeable by receiving the electric power from said power generation unit, and a driving force generation unit generating a driving force of a vehicle by receiving the electric power supplied from said power storage unit, said method of controlling the hybrid vehicle comprising the steps of:

detecting a state of charge and a temperature of said power storage unit;

calculating charge/discharge power allowable in said power storage unit based on the state of charge and the temperature of said power storage unit detected by said detecting step;

setting control-specific charge/discharge allowable power by correcting charge/discharge allowable power calculated by said calculating step so as to limit the charge/discharge allowable power to be changed at a predetermined first change speed; and determining a power target value in accordance with a request from a driver within a range of said control-specific charge/discharge allowable power set by said setting step, and feedback-controlling the electric power charged and discharged in said power storage unit in accordance with the power target value, said determining step including the step of performing control for starting said internal combustion engine in response to a request at start-up of said hybrid vehicle within a range of said control-specific charge/discharge allowable power, when performing said control for said internal combustion engine, said internal combustion engine is started by receiving the electric power supplied from said power storage unit and said driving force generation unit is operated in regenerative mode so as to reduce rattling noise, said setting step including the step of setting said control-specific charge/discharge allowable power such that, at start-up of said hybrid vehicle, a maximum value of the charge/discharge power allowable in said power storage unit is set as an initial value and the control-specific charge/discharge allowable power is decreased from the initial value at a predetermined second change speed higher than said first change speed.

4. The method of controlling a hybrid vehicle according to claim 3, wherein said first change speed is set below a change speed of the electric power charged and discharged in said power storage unit in accordance with said power target value, and said second change speed is set higher than the change speed of the electric power charged and discharged in said power storage unit in accordance with said power target value.

* * * * *